United States Patent [19]

Bertrand

[11] Patent Number: 4,491,755
[45] Date of Patent: Jan. 1, 1985

[54] IMPROVEMENTS TO MOUNTING ELECTRIC RETARDERS ONTO A GEAR CASING OF A VEHICLE

[75] Inventor: Philippe Bertrand, Maisons-Lafitte, France

[73] Assignee: Labavia - S.G.E., Bois d'Arcy, France

[21] Appl. No.: 500,961

[22] Filed: Jun. 3, 1983

[30] Foreign Application Priority Data

Jun. 17, 1982 [FR] France ............................. 82 10608

[51] Int. Cl.³ ............................................. H02K 49/04
[52] U.S. Cl. .................................. 310/93; 188/18 R; 403/337
[58] Field of Search ................... 310/77, 93, 103, 105, 310/83; 188/17, 18 R, 161, 18; 403/316, 317, 326, 337; 411/84, 85, 90-92, 96, 337, 352, 353; 464/10, 30, 36

[56] References Cited

U.S. PATENT DOCUMENTS

| | | | |
|---|---|---|---|
| 1,940,886 | 12/1933 | Rosenberg | 403/337 |
| 3,381,153 | 4/1968 | Bessiere | 310/93 |
| 3,601,429 | 8/1971 | Coski | 403/337 |
| 3,908,141 | 9/1975 | Lemonnier | 310/93 |
| 4,128,147 | 12/1978 | Ruberte | 310/93 |

*Primary Examiner*—R. Skudy
*Assistant Examiner*—D. L. Rebsch
*Attorney, Agent, or Firm*—Cushman, Darby & Cushman

[57] ABSTRACT

The electric retarder comprises a stator (1) mounted through a frame (11) to a casing (4) of a vehicle drive axle and a rotor with two disks (2) supported by a central plate (17), which plate is mounted on a collar (8) fitted on the end of a stub-shaft (3) extending from the casing and is coupled to a universal joint. For assembling the plate to the collar and the end flange (24) of the universal joint to the plate, and to close the jaw (23) of this universal joint formed by two bearing blocks (26) and two clamps (27), on the corresponding journals, recourse is had to twelve screws, namely four screws A, four screws B and four screws C staggered angularly by about 30° with respect to each other about the axis X of the retarder.

11 Claims, 7 Drawing Figures

IMPROVEMENTS TO MOUNTING ELECTRIC RETARDERS ONTO A GEAR CASING OF A VEHICLE

The invention relates to electric "eddy current" retarders or speed reducers.

The invention relates more particularly to those retarders which are mounted directly on a gear box of a motor vehicle transmission, such as the rear axle casing or the gear box of a vehicle and which include an annular inductor stator mounted in catilever fashion on the casing by means of an apertured bell-shaped frame, and a rotor comprising two armature disks made from a ferromagnetic material which surround the stator and are both supported by a central plate. The central plate is itself mounted in cantilever fashion on a stub shaft extending from the casing by being mounted on a collar integral with the stub-shaft. Each disk is firmly secured, by means of a ring of arms forming ventilation fins, to a supporting ring fixed on the plate, and the plate being itself coupled to the end flange of a universal joint on the axial side opposite the one where the stub shaft is located so that at least the largest part of the universal joint is situated within the axial space taken up by the rotor, i.e. within the volume defined by the corresponding rotor ring.

The invention also relates to the different components and supports for such retarders as well as the sub-assemblies formed by an assembly of some of these components and/or supports.

A conventional retarder has been described in U.S. Pat. No. 3,496,396 and illustrated in FIG. 2 of this patent.

The advantage offered by retarders of this type is known, particularly in that mounting thereof on the casing and on the stub-shaft only minimally extends the axial distance between these elements and the universal joint. Additionally, retarders generate relatively high retarding torques for a given mass and size.

However, assemably of such retarders and/or their universal joints can present difficulties. In particular, difficulties are encountered since the screws for coupling the elements of the transmission together are not very accessible. (The word "screws" is meant to refer here and in what follows to not only a bolt nut assembly but also a threaded shank having an enlarged head and a foot screwable into a tapped complementary housing formed in one of the parts to be assembled together).

Thus, with the above-mentioned conventional retarders the screws which ensure the mutual assembly of the collar, the central plate and the flange exhibit the following disadvantages:

the accessibility of at least some of the screws requires the rotor ring situated on the same side as the universal joint to itself be disassembled and separated from the plate, and removal of the universal joint requires the entire retarder to be disassembled.

A solution for partly overcoming these disadvantages was proposed in U.S. Pat. No. 3,908,141.

In accordance with U.S. Pat. No. 3,908,141, the central plate and a portion of the universal joint comprising the flange are formed as a single piece.

This solution, which eliminates a screw-assembly stage, namely that of the screws between the central plate and the flange, allows the remaining screws to be placed in more accessible positions.

However, it is not applicable if the universal joint is too large, i.e. when the internal diameter of the rotor ring supporting the ring of arms which surrounds the joint is too small for the rotor ring to allow the corresponding portion of the joint. In this case, in fact, the rotor ring could not be freed from the monobloc part.

The invention offers a particularly neat solution to these different problems by avoiding the disadvantages of the previously proposed solutions by using screws which are all axially accessible. Selective assemblies may be made of the different elements of the retarder which allows in all cases, the universal joint to be removed without having to remove the retarder.

To this end, the retarder of the invention still comprises the collar integral with the stub-shaft, the central plate and the end flange of the universal joint which are independent of one another. Furthermore the assembly of the central plate to the collar and that of the flange to the central plate are provided first by means of four screws A and four screws B, the second by means of the four screws B and four screws C, respectively. The axes of the twelve screws A, B and C extend parallel to the axis X of the retarder, at substantially identical distances from this axis X and spaced apart evenly or substantially evenly about this axis X.

By the word "substantially" is meant here that the identity or the regularity is within ±15%, preferably within ±10%.

Thus the angles formed between the screws by planes which pass through axis X and by the different axes of the respective screws may all be equal to 30°, which corresponds to an "even" spacing apart of these axes about axis X, but are more generally between 25° and 35°, being preferably between 27° and 33°.

In preferred embodiments, recourse is further had to one and/or the other of the following arrangements:

furthermore, screws A and B may respectively be short and long bolts which cooperate with nuts at their axial ends disposed on the same side as the universal joint. The bolts may have their heads held in position axially against the collar, even before screwing, by means of a washer, preferably welded to the root thereof.

Screws C are screws, whose threaded ends cooperate with tapped complementary housings formed in the central play.

The jaw of the universal joint disposed on the flange side is formed by two bearing blocks integral with the flange and projecting axially from two diametrically opposite portions of the flange, two clamps fixed by screwing respectively on the two bearing blocks and each of the bearing blocks has at least one screw C passing axially therethrough.

In a retarder according to the two preceding paragraphs, each bearing block has a single screw C passing axially therethrough (called hereafter C') through a bore opening into the bottom of the bearing block, while each of the two screws C which do not pass through a bearing block (hereafter called C") only passes through the flange and the axis of the twelve screws A, B, C' and C" are spaced evenly apart about axis X in the order ABC"BAC'ABC"BAC'.

In a retarder according to the paragraph which precedes the preceding one, the four screws C themselves serve for fixing the clamps to the bearing blocks.

Thus, the planes passing through axis X of the retarder and respectively through the axes of screws A are staggered with respect to each other by 90° about axis X, while the planes passing through axis X and through respectively the axes of screws B are staggered by 30° with respect to the same plane P passing through axis X and through the axis of a screw A. The planes passing through axis X and through the axes of scews C, respectively, are staggered by angles slightly greater than 60° with respect to plane P.

The axial movements of the two journals of the universal joint housed in the jaw of the joint situated on the flange side are limited by plates fixed to the sides of the jaw and each having an area which extends over the axial path. Preferably, the plates are formed washers.

The present invention comprises, apart from these main arrangements, certain other arrangements which are preferably used at the same time and which will be discussed more explicitly hereafter.

BRIEF DESCRIPTION OF THE ACCOMPANYING DRAWINGS

In what follows, two preferred embodiments of the invention will be described with reference to the accompanying drawings in a way which is of course in no wise limiting and wherein.

In each embodiment of this invention it is desired to mount, in cantilever fashion on the output of a rear axle casing or a gear box of a motor vehicle, an eddy current retarder with axis X comprising:

(a) an annular inductor stator 1 comprising electric windings and having two annular series of flat magnetic poles with alternating polarities, and (b) and an armature rotor formed of two disks 2 made from a ferromagnetic material surrounding the stator 1 axially and so as to travel past the poles of stator 1 from which they are separated by a small clearance or airgap.

Figure 1:
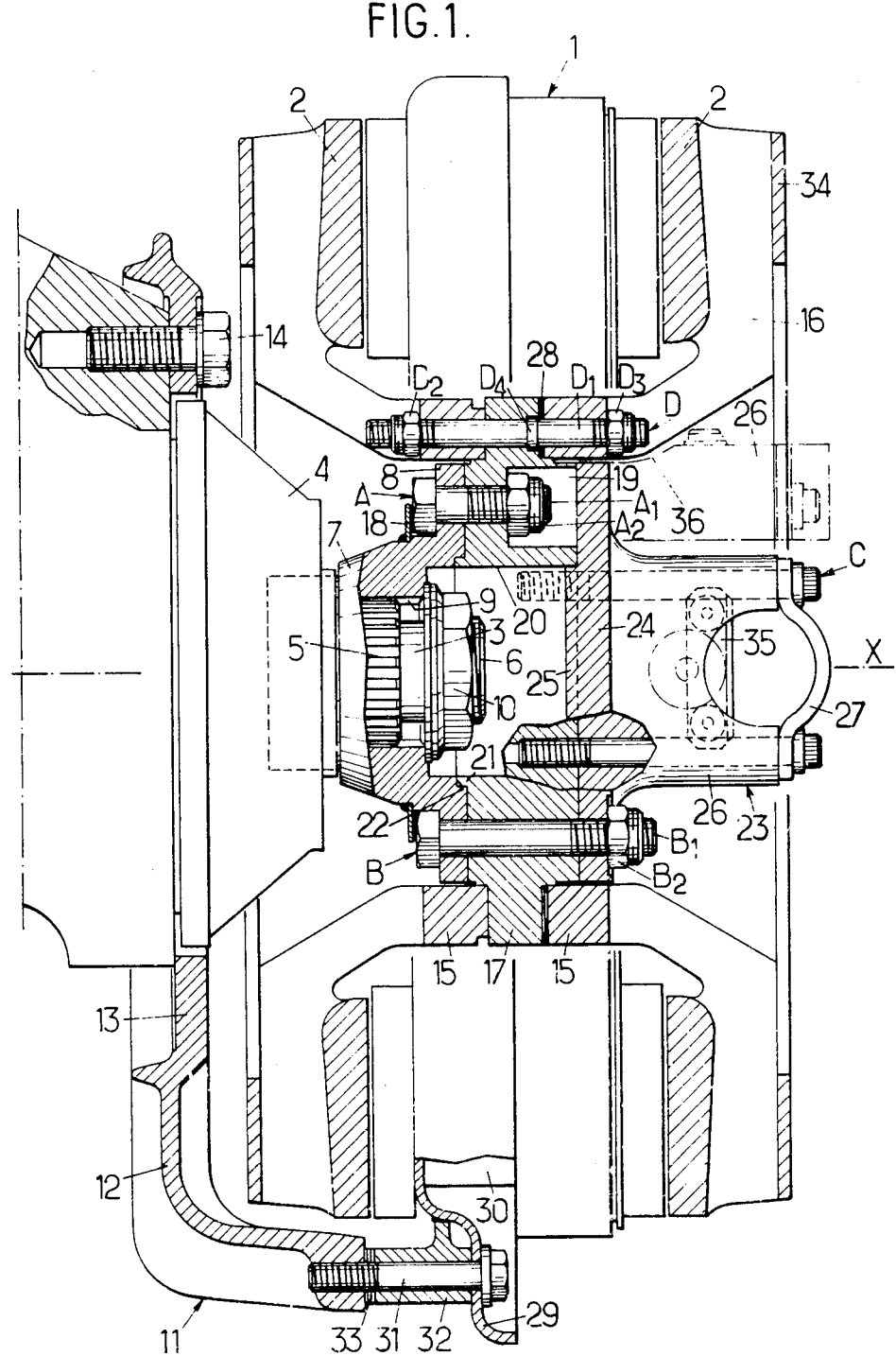
FIG. 1, shows in axial section along I—I of FIG. 3, the assembly of an electric retarder constructed in accordance with the invention and of parts for mounting it on the rear axle of a vehicle.

A stub-shaft 3, with axis X projects from the casing 4 which, in FIG. 1, is assumed to be a rear axle casing.

Stub shaft 3 is externally splined at 5 and terminates in an externally threaded end-piece 6.

A sleeve 7, extended radially by a collar 8 and having internal splines 9 complementary to the external splines 5 is jointingly engaged therewith, the fixing of sleeve 7 to the stub-shaft 3 being completed by screwing a nut 10 on to the threaded end-piece 6 so that nut 10 bearing axially on the sleeve 7.

In a manner known, the stator 1 is mounted in cantilever fashion on casing 4 by means of an apertured frame 11 formed more particularly by four arms 12 extending from a common annular hub 13, hub 13 itself screwed to the casing 4 by means of screws 14, Two rotor disks 2 are mounted in cantilever fashion on the stub-shaft 3, or more precisely on collar 8, and firmly secure a ring 15 to each of the disks 2 by means of a ring of arms 16 forming ventilation fins, by screwing the two rings 15 to the periphery of a central plate 17 and fixing plate 17 to collar 8, There is also coupled to plate 17 a universal joint (not shown) forming part of the transmission of the vehicle and which connects the stub-shaft 3 to the rest of the transmission despite any misalignment between the elements thus assembled.

It is essentially in the way in which the different couplings are provided that the present invention resides.

Securing of central plate 17 to collar 8 is provided by means of four short screws A and four long screws B.

Although screws A and B may be each forme by ordinary screws, each comprising a threaded end directly screwable into a complementary tapped hole in one of the parts to be assembled, they are preferably formed here by a bolt-nut assembly.

Thus, in the embodiment illustrated, each screw A comprises a short bolt $A_1$ and a nut $A_2$ while and each screw B comprises a long bolt $B_1$ and a nut $B_2$. Nuts $A_2$ and $B_2$ are preferably of a self-locking type.

Figure 2:
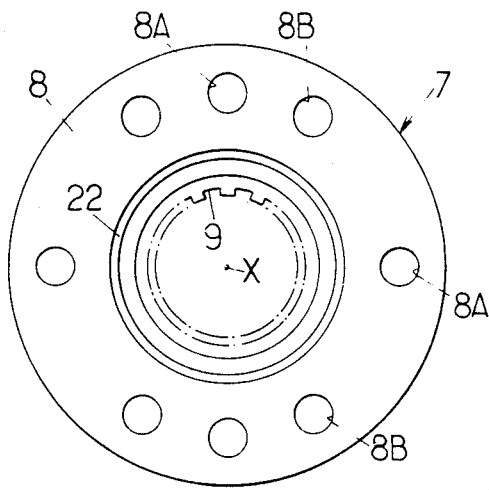
FIGS. 2, 3 and 4 show in an end view respectively three parts of the FIG. 1 assembly.
Figure 3:
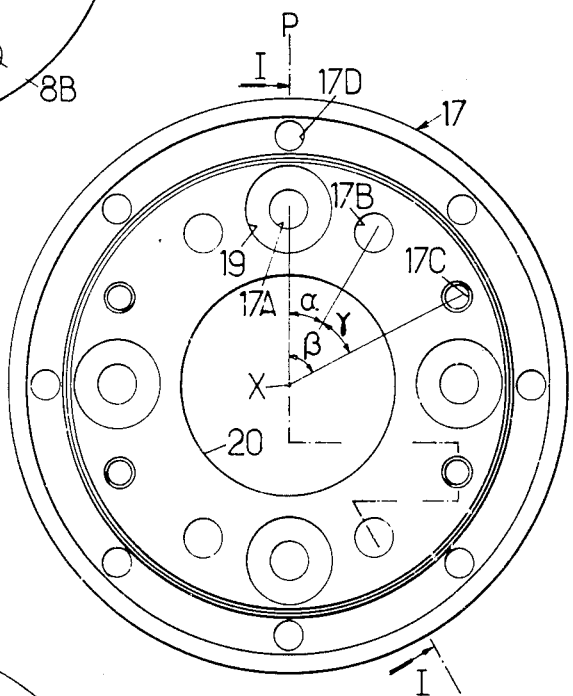
Figure 6:
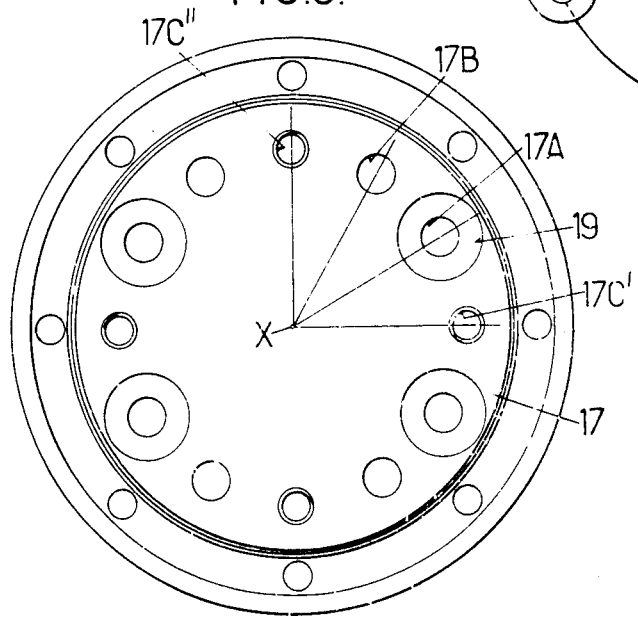

The holes formed axially in collar 8 for receiving screws A and B have been designated respectively in FIG. 2 by the references 8A and 8B and those formed axially in plate 17 for receiving these same screws have been designated respectively in FIGS. 3 and 6 by the references 17A and 17B.

If the different holes are allowed with respect to the points of intersection of their axes with the plane of drawings FIG. 3, it can be said, in the first embodiment shown in FIGS. 1 to 4, that the holes intended to receive the four screws A are angularly staggered from each other by 90° about axis X and that the holes intended to receive screws B are all staggered by an angle $\alpha$ equal to 30° with respect to an axial reference plane P comprising the axes of two diametrically opposite holes intended to receive screws A.

Each bolt head $A_1$ or $B_1$ is preferably held axially in place after engagement of the corresponding bolt in the appropriate hole 8A or 8B of collar 18 by fixing a washer 18 to the outer surface of sleeve 7, more especially by welding this washer after application against a shoulder of this surface.

Thus held in place, the bolt may be mounted in readiness on the collar and thus the assembly will be facilitated as will be explained further on.

Recesses 19 are formed in central plate 17 for receiving completely the feet of the short bolts $A_1$ as well as nuts $A_2$.

A cylindrical bore 20 is formed in the center of plate 17, which bore receives the threaded end 6 as well as a portion of nut 10.

An annular projection 21 and a complementary annular groove 22 are provided respectively in collar 8 and plate 17 for mutually centering these two parts.

The universal joint to be connected to plate 17 comprises a jaw 23 on the same side as plate 17 forming a bearing for two coaxial journals comprising the cross pin of this joint, said jaw being integral with an end flange 24.

Fixing of flange 24 to plate 17 is provided by the four preceding long screws B and four other screws C.

In other words, the long bolts $B_1$ pass axially through each of the three parts 8, 17 and 24 through respectively smooth holes 8B, 17B and 24B.

The outer diameter of flange 24 is sufficient to completely cover recesses 19 when flange 24 is fixed to the plate 17.

Nuts $A_2$ thus become invisible from the outside and are totally protected from projection of water, mud and similar debris.

Flange 24 has a circular front shoulder 25 penetrating jointingly into the adjacent end of bore 20 of the plate for mutually centering the flange on this plate.

Jaw 23 is formed by two bearing blocks 26 which are open in the axial direction and which project axially from two diametrically opposite marginal zones of the face of the flange 17 turned towards the universal joint.

Bearing blocks 26 receive two coaxial journals, of the cross-pin comprising the joint, equipped with their bearing cages, these cages then being locked in the openings of the bearing blocks 26 by screwing clamps 27 onto blocks 26.

Clamps 27 are preferably formed by plates bent in the form of a flattened capital omega.

Figure 4:
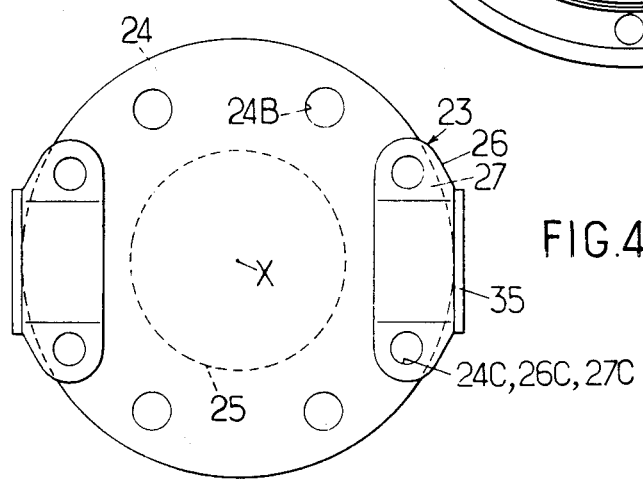

The clamps are screwed to the bearing blocks in the first embodiment of FIGS. 1 and 4, by means of the above screws C.

In other words, each screw C passes axially through a lug of a clamp 27, the corresponding bearing block 26, flange 24 and at least a part of the thickness of plate 17.

Plate 17 does not have screws C passing completely therethrough since screws C are screwed into complementary tapped holes 17C formed in plate 17 after passing through smooth holes 27C, 26C and 24C formed respectively in the other parts.

If the plane of FIG. 3 is considered and if the different holes are assimilated to the intersection points of their axes with this plane, it may be said that the holes intended to receive screws C are staggered by angles $\beta$ of about 60°, and preferably slightly greater than 60°, with respect to the above-reference plane P.

That means that the angular stagger $\gamma$ (FIG. 3) between two successive holes assigned respectively to receive a screw B and a screw C is of the order of 30°, and preferably a little less than 30°.

More generally, it can be seen that the twelve screws A, B and C are spaced apart about axis X of the retarder with angular spacings of the order of 30°, in the order ABCACBABCACB.

The drive torque conveyed along the transmission of the vehicle, i.e. the torque transmitted from the motor to the driving wheels of the vehicle, is transferred successively from collar 8 to plate 17, then from plate 17 to flange 24. The resistance to shearing of the different screw assemblies providing the mutual couplings between these parts should then be identical.

The sections and distances to axis X of screws A and C are then provided so that the resistance to angular shearing of a screw A is practically equal to that of a screw C.

There can be further seen in FIG. 1 that one of the screws D (generally four or eight in number serve to fix rings 15 to the periphery of plate 17) is formed by a smooth shank $D_1$ threaded at both its ends and by two self-locking nuts $D_2$ and $D_3$ coacting respectively with the two threaded ends. An intermediate collar $D_4$ is provided on the shank and abuts axially against a complementary bearing surface of plate 17, itself formed with holes 17D for receiving shanks $D_1$.

Adjusting shims 28 are interposed between at least one of rings 15 and plate 17 while the transverse cup 29 carries the stator windings 30.

One of the screws 31 serves to fix cup 29 to frame 11, with interpositioning of a spacing socket 32 and adjusting shims 33 while the outer washer 34 molded with each ring of arms 16 is provided for mechanical and thermal functions.

A thin plate 35 is secured to the outer side of each bearing block 26, more especially by screwing, for limiting the axial movements of the journals and bearing housed in these bearing blocks, each plate having an area which extends transversely towards the inside of the corresponding bearing and being formed by a bar, as shown, or by a washer as shown with a broken line, A slightly thinned down portion 36 in the base of the side in question allows the smaller diameter portions of arms 16 to pass therethrough.

To mount the retarder of the type described above on the axle output, the following series of operations are carried out:

Frame 11 is first mounted on casing 4 of the axle by means of screws 14.

The assembly of four short bolts $A_1$ and four long bolts $B_1$ are then placed in a ready position on collar 8 and their heads are held axially against collar 8 by welding washer 18 to sleeve 7.

Sleeve 7 thus equipped is fitted on the splined endpiece 3 and is locked in its mounting position by screwing nut 10 on the threaded end 6 of the end-piece, The rotor ring is fixed on the periphery of central plate 17 as close to the rear axle as possible by screwing nuts $D_2$ on shanks $D_1$, which are held in axial abutment against said plate by abutment of their collars $D_4$.

The assembly of the thus equipped plate is mounted on the eight bolts A and B waiting in readiness and the four nuts $A_2$ are screwed on to bolts $A_1$ at the bottom of recesses 19.

The stator 1 is positioned by screwing screws 31 after adjustment of the first air-gap by means of a judicious choice of shims 33, while the second rotor ring is positioned on the periphery of plate 17 by screwing nuts $D_3$ on shanks $D_1$ waiting in the ready position after adjustment of the second air-gap by a judicious choice of shims 28.

Flange 24 is then positioned on plate 17 by screwing the four nuts $B_2$ on bolts $B_1$ in the ready position, The journals with the bearing of the universal joint are transversely introduced into the openings of bearing blocks 26, and the thus positioned bearing is capped by clamps 27. The assembly is finished by screwing screws C through the clamps, the bearing blocks and flange into complementary tapped holes in plate 17.

Dismantling of the joint and of the retarder is accomplished just as simply by the succession of operations which are the reverse of the preceding ones, in the reverse direction.

The screwing and unscrewing required in the assembly and disassembly in question are all easy to carry out because of the perfect axial accessibility of all the threaded members (screws, bolts and nuts) to be handled.

The proposed construction further lends itself to very easy removal of the universal joint without any dismantling of the retarder, which allows the air-gap settings to be kept.

It is moreover applicable even in the situation where the inner diameter of each rotor ring 15 is too small to allow jaw 23 to pass therethrough equipped with its abutment plates 35 which is true for the embodiment illustrated as shown by the broken line portion in FIG. 1. The brow line portion represents the position of jaw 23 staggered by 90° about axis X with respect to the position which it occupies in this FIG. 1.

Figure 5:
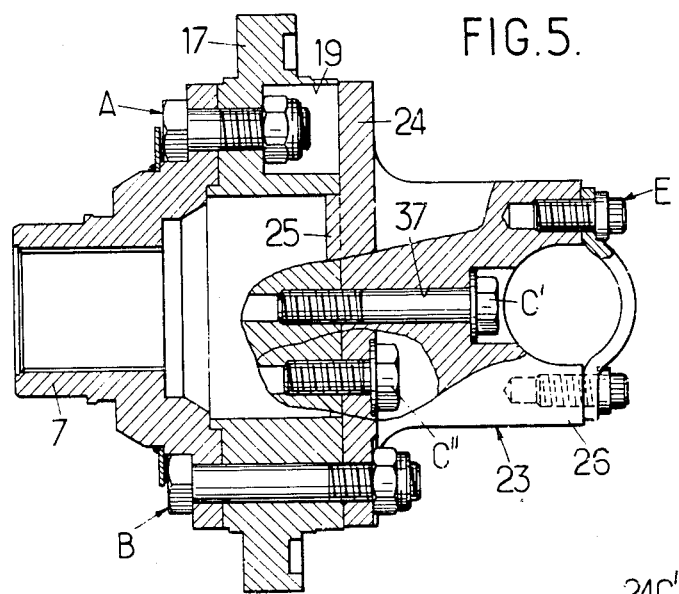
FIG. 5 shows in a section similar to that of FIG. 1 a portion of another assembly in accordance with the invention.
Figure 7:
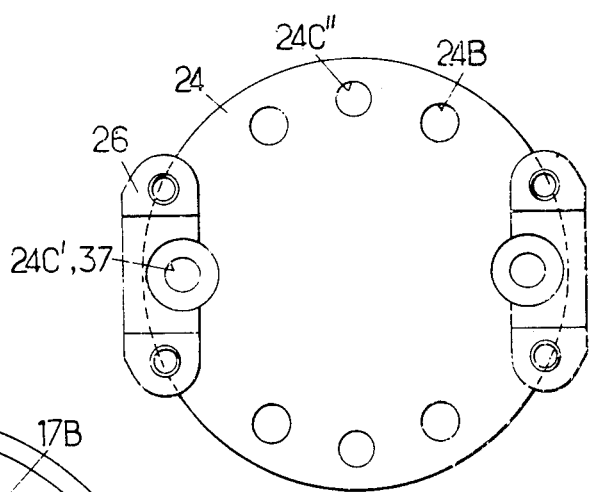
FIGS. 6 and 7 show end views respectively of two parts of the FIG. 5 assembly.

In the second embodiment illustrated in FIGS. 5 to 7, most of the features which have been previously described are to be found, and some of which appear on the figures with the same references as before, the other common features not having been reproduced for the sake of simplicity.

The second embodiment differs from the first one essentially by the following points:

In the first place, whereas in the first embodiment the four screws C for assembling flange 24 to central plate 17 were all identical and all served moreover to fix a clamp 27 to a bearing block 26, these four screws C are formed according to the embodiment of FIG. 5 by two long screws C' each passing through one of the bearing blocks 26 at its center, while being housed for this purpose in a bore 37 which opens out at the bottom of the bearing block 26, Also, two short screws C" are provided, each passing solely through flange 24.

As before, each of the screws C' and C" has a threaded foot screwed directly into complementary tappings provided in central plate 17.

Secondly, the axes, parallel to each other, of the different screws are all disposed at the same distance from axis X of the retarder and are evenly spaced apart angularly about this axis, i.e. spaced apart from each other by 30°, and this in the order ABC"BAC'ABC"BAC'.

In other words, axes A are no longer staggered by 90° with respect to each other but by 60° or 120° and axes C' are each situated between two neighboring axes A.

This staggering can be seen in FIGS. 6 and 7 which respectively show the central plate 17 and jaw 23 and in which each screw reception hole is designated by the reference of the part in which the hole is formed, which reference has added thereto a letter identical to the letter designating the screw to be accorded thereby.

Clamps 27 are then screwed to bearing blocks 26 by means of relatively short screws E, independent of screws C' and C" and assigned exclusively to this function.

This second embodiment is advantageous when the bearing blocks 26 are relatively far removed from axis X.

In fact, in such a situation, the axes of screws E are themselves too far away from axis X to permit the use of such long-axis long screws. Such long-axis screws would radially project outside flange 24 and would thus not be acceptable since flange 24 must be surrounded practically jointly by one of rings 15.

The distance between the axis of each central screw C' and the axis X is on the contrary sufficiently small to satisfy this requirement, or at least to be made as can be seen in FIG. 7.

While the invention has been described in terms of what is presently conceived to be the most preferred embodiments thereof, those in this art may appreciate that modifications can be made thereto, which modifications shall be accorded the broadest interpretation of the appended claims.

I claim:

1. An electric retarder assembly coaxially mounted with respect to an axis X between a gear case and a universal joint, said gear case including a frame and a threaded stub shaft each coaxially mounted with respect to said axis X, said assembly comprising:
   an annular inductor stator defining inner and outer surfaces;
   means to mount said stator to said frame;
   a rotor including inner and outer armature disks formed of a ferromagnetic material;
   means to mount said inner and outer armature disks in confronting relationship to said inner and outer surfaces to permit relative movement between said inner and outer armature disks of said rotor and said inner and outer surfaces of said stator, respectively;
   a collar plate defining a central aperture in which said stub shaft is accepted;
   nut means threadably engaged with said stub shaft for rigidly connecting said collar plate to said stub shaft;
   an end flange including means to connect said end flange to said universal joint;
   a central plate disposed between said collar plate and said end flange; and
   means for rigidly mounting said central plate to said collar plate and for mounting said end flange to said central plate, said mounting means including:
   (a) a first grouping of plural registered apertures defined in said collar plate and said central plate, said first grouping being radially spaced-apart about axis X at first positions; said central plate further including means associated with each aperture of said first grouping for defining plural recesses adjacent to said end flange;
   (b) plural first bolt means each disposed in a respective aperture of said first grouping of apertures, for securing said central plate to said collar plate, said recessed surface defining means for housing a respective terminal end of each said first bolt means;
   (c) a second grouping of plural registered apertures defined in said end flange, said central plate and said collar plate, said second grouping being radially spaced apart about axis X at second positions; and
   (d) plural second bolt means each disposed in a respective aperture of said second grouping of apertures for securing said end flange to said central plate; wherein
   said terminal ends of each said plural first bolt means are covered and thus protected by said end flange.

2. An electric retarder as in claim 1 wherein said first and second bolt means include plural short bolts A and long bolts B, respectively, each of said bolts A and B having axially separated head and threaded portions and a nut threadably secured to said threaded portion and wherein said assembly further includes means for holding said head of each of said bolts A and B axially in position in said respective apertures of said first and second aperture groupings to aid in threadably securing said nut to said respective threaded portion of each.

3. An electric retarder as in claim 2 wherein said holding means further includes plural plates each fixed to said collar plate to define a space therewith to accept and thus hold a respective one of said heads.

4. The retarder according to claim 1 wherein said universal joint is connected to said end flange by means of first and second bearing blocks integral with said end flange, said first and second bearing blocks projecting axially from two diametrically opposite portions of said end flange and each including a clamp fixed to a respective one of said bearing blocks, and wherein said first and second bearing blocks respectively include at least one bolt C.

5. The retarder according to claim 4 wherein each said bearing block includes bolts C, C' disposed in a bore defined in the bottom of said bearing block and wherein a second pair of bolts C, C" which do not pass through said bearing blocks, only pass through the end flange, and wherein the axes of the bolts A, B, C' and C" are spaced apart evenly about axis X in the order ABC'-'BAC'ABC"BAC'.

6. The retarder according to claim 4, further including four bolts C which serve to fix the clamps to the bearing blocks.

7. The retarder according to claim 6, wherein
planes P passing through the axis X of the retarder and through respectively the axes of bolts A are staggered with respect to each other by 90° about axis X,
planes passing through axis X and through respectively the axes of bolts B are staggered by 30° with respect to the same plane P passing through axis X and through the axis of a bolt A, and wherein
planes passing through axis X and through respectively the axes of bolts C are staggered by angles slightly greater than 60° with respect to said plane P.

8. The retarder according to claim 1 wherein the axial movement of two journals of the universal joint housed in the jaw mounted on the end flange are limited by plates secured to the sides of the jaw, each having an area which extends over the axial path of the two journals.

9. An electric retarder as in claim 1 further comprising means defining plual radially spaced apart tapped housings in said central plate, a third grouping of apertures defined in said end flange each in registry with a respective one of said tapped housings, and plural third bolt means including plural threaded bolts C each disposed in a respective one of said apertures in said third aperture grouping and cooperating with one of said tapped housings in registry therewith for mounting said end flange to said central plate.

10. An electric retarder as in claim 9 wherein said plural threaded bolts include a first pair of bolts C and a second pair of bolts C'.

11. An electric retarder as in claim 8 wherein said plates include washers.

* * * * *